(12) United States Patent
Prost et al.

(10) Patent No.: US 12,090,790 B2
(45) Date of Patent: Sep. 17, 2024

(54) TIRE WITH A TREAD SUB-LAYER CONTAINING MULTIPLE MATERIALS

(71) Applicant: COMPAGNIE GENERALE DES ETABLISSEMENTS MICHELIN, Clermont-Ferrand (FR)

(72) Inventors: Pascal Prost, Clermont-Ferrand (FR); Christopher Careme, Clermont-Ferrand (FR); David Dean, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 118 days.

(21) Appl. No.: 16/964,190

(22) PCT Filed: Jan. 18, 2019

(86) PCT No.: PCT/FR2019/050097
§ 371 (c)(1),
(2) Date: Jul. 22, 2020

(87) PCT Pub. No.: WO2019/145621
PCT Pub. Date: Aug. 1, 2019

(65) Prior Publication Data
US 2021/0031565 A1 Feb. 4, 2021

(30) Foreign Application Priority Data
Jan. 25, 2018 (FR) ...................................... 18/50574

(51) Int. Cl.
*B60C 11/00* (2006.01)
(52) U.S. Cl.
CPC ...... *B60C 11/0058* (2013.01); *B60C 11/0075* (2013.01); *B60C 2011/0025* (2013.01)

(58) Field of Classification Search
CPC ............. B60C 11/0058; B60C 11/0075; B60C 2011/0025
See application file for complete search history.

(56) References Cited

U.S. PATENT DOCUMENTS

| 4,444,236 A * | 4/1984 | Kan | ...................... B60C 1/0016 |
| | | | 152/549 |
| 2015/0239296 A1 * | 8/2015 | Fukuda | ............... B60C 11/1376 |
| | | | 152/209.5 |

(Continued)

FOREIGN PATENT DOCUMENTS

| CN | 109562651 | 4/2019 |
| EP | 3141402 | 3/2017 |

(Continued)

OTHER PUBLICATIONS

Machine translation for Japan 63-240405 (Year: 2023).*
Machine translation for Japan 2012-188040 (Year: 2023).*

*Primary Examiner* — Steven D Maki
(74) *Attorney, Agent, or Firm* — Cozen O'Connor (57) ABSTRACT

Tire (1) having a sub-layer (7) made up substantially of a base layer (71) disposed radially on the crown reinforcement (5) and axially between the median plane (CP) and a shoulder (60), said base layer (71) being made up of a rubber compound of given stiffness A, a covering layer (72) disposed radially on the base layer (71) and radially on the inside of the tread (6) and axially at least in sections situated between the median plane (CP) and the shoulder end (721), said covering layer (72) being made up of a rubber compound of given stiffness B, the stiffness A being less than the stiffness B, and the stiffness B being greater than the stiffness M.

8 Claims, 5 Drawing Sheets

(56) References Cited

U.S. PATENT DOCUMENTS

| | | | |
|---|---|---|---|
| 2016/0082774 A1* | 3/2016 | Zhao | B60C 11/005 |
| | | | 152/153 |
| 2017/0050469 A1* | 2/2017 | Hashimoto | B60C 11/00 |
| 2019/0232720 A1 | 8/2019 | Prost et al. | |
| 2019/0255887 A1* | 8/2019 | Perrin | B60C 9/18 |

FOREIGN PATENT DOCUMENTS

| | | |
|---|---|---|
| FR | 2 954 333 | 6/2011 |
| FR | 2 999 118 | 6/2014 |
| FR | 3007693 | 1/2015 |
| JP | 63-240405 A * | 10/1988 |
| JP | H 08 104107 | 4/1996 |
| JP | 2012-188040 A * | 10/2012 |
| WO | WO 2014/005927 | 1/2014 |
| WO | WO 2015/170615 | 11/2015 |
| WO | WO 2018/002488 | 1/2018 |
| WO | WO-2018/002488 A1 * | 1/2018 |
| WO | WO 2018/020103 | 2/2018 |
| WO | WO 2019/016440 | 1/2019 |

\* cited by examiner

TIRE WITH A TREAD SUB-LAYER CONTAINING MULTIPLE MATERIALS

RELATED APPLICATIONS

This is a U.S. National Phase Application under 35 USC 371 of International Application PCT/FR2019/050097 filed on Jan. 18, 2019.

This application claims the priority of French application no. 18/50574 filed Jan. 25, 2018, the entire content of which is hereby incorporated by reference.

FIELD OF THE INVENTION

The present invention relates to tires, and more particularly to a tire, the performance of which in terms of rolling resistance and road holding is improved.

BACKGROUND OF THE INVENTION

In general, a tire is an object with a geometry exhibiting symmetry of revolution about an axis of rotation. A tire comprises two beads intended to be mounted on a rim; it also comprises two sidewalls connected to the beads, a crown comprising a tread intended to come into contact with the ground, the crown having a first side connected to the radially outer end of one of the two sidewalls and having a second side connected to the radially outer end of the other of the two sidewalls.

The makeup of the tire is usually described by a representation of its constituent components in a meridian plane, that is to say a plane containing the axis of rotation of the tire. The radial, axial and circumferential directions denote the directions perpendicular to the axis of rotation of the tire, parallel to the axis of rotation of the tire and perpendicular to any meridian plane, respectively. In the following text, the expressions "radially", "axially" and "circumferentially" mean "in a radial direction", "in the axial direction" and "in a circumferential direction" of the tire, respectively. The expressions "radially on the inside" and "radially on the outside" mean "closer to" and "further away from the axis of rotation of the tire, in a radial direction", respectively. The equatorial plane CP is a plane perpendicular to the axis of revolution of the tire, positioned axially so as to intersect the surface of the tread substantially midway between the beads. The expressions "axially on the inside" and "axially on the outside" mean "closer to" and "further away from the equatorial plane of the tire, in the axial direction", respectively.

As is known, tires for road applications, and very particularly tires for passenger vehicles make an essential contribution to the performance of the vehicles in terms of rolling resistance (and thus energy efficiency of the vehicles), of grip, of dynamic response for guiding the vehicles (notably when cornering) and of wear (and thus overall cost of using the vehicles). Of the tire design parameters, a person skilled in the art is aware of the importance of the choice of the material of which the tread is made and the material of which the sub-layer is made. One example of a sub-layer, that is to say of a layer of rubber interposed between the crown reinforcement and the material of the tread, is described in the document FR 2 954 333. In general, sub-layer materials under the tread are used to improve the rolling resistance of the tire with a material of low hysteresis, or to stiffen the tread in shear, but with modest stiffnesses so as not to excessively counter the flattening of the tread of the tire in its contact patch in which it is in contact with the ground.

However, the lower the stiffness, the less good the drift thrust response of the tire is when subjected to stress by the vehicle turning. Specifically, schematically, the stack of layers of rubber radially on the outside of the crown reinforcement can be considered to be a succession of springs in series. It is for this reason that the introduction of materials with too low a modulus is avoided so as not to impair the cornering stiffness. Also, the dynamic shear modulus $G^*$ of a sub-layer material is generally greater than 1 MPa. However, this may conflict with the objective of minimizing the rolling resistance. Even in the variants with the greatest stiffnesses, the dynamic shear modulus $G^*$ of a sub-layer material is generally much less than 8 MPa, even when the best performance in terms of handling is desired. In the present document, it is noted that the dynamic shear modulus $G^*$ in question, selected from other possibilities for characterizing stiffness, is the dynamic shear modulus $G^*$ measured at 23° C. and under an alternating shear stress at a frequency of 10 Hz and at 10% deformation.

The document WO 2015/170615 also discloses a tire having a base layer, that is to say a sub-layer, formed of two radially superposed materials. The modulus of the material of the tread and the tg δ (tangent delta) value thereof are lower than the values of the same parameters of the sub-layer material in contact with the tread material, that is to say that of the two radially outermost layers. The modulus of the material of the radially inner layer of the sub-layer materials and the tg δ value thereof are lower than the values of the same parameters of the sub-layer material in contact with the tread material. However, a tire made according to this teaching does not achieve any progress in terms of the balance of performance properties.

The document FR 2999118 A1 also discloses a tire in which the tread (and not the sub-layer) is made up of three different rubber compounds, with a very different aim since it is a matter of electrical resistivity. The document WO 2014/005927 A1 also discloses a tire in which the tread (and not the sub-layer) is made up of two different rubber compounds, with a very different aim since it is a matter of resistance to attack and to wear of a tire for vehicles of construction plant type. The document FR 3007693 A1 also discloses a tire in which the tread (and not the sub-layer) is made up of two different rubber compounds.

The objective of the invention is to achieve a better dynamic drift thrust response under turning stress without worsening the rolling resistance of the tire.

SUMMARY OF THE INVENTION

The subject of the invention is a tire having an axis of rotation and a median plane perpendicular to the axis of rotation, and comprising:
  a crown reinforcement,
  a tread radially on the outside of the crown reinforcement, the tread extending axially between two shoulders, the tread comprising a contact face intended to come into contact with the roadway when the tire is being driven on, the tread being made up of at least one rubber compound of given stiffness M, and
  a sub-layer disposed radially on the outside of the crown reinforcement and radially on the inside of the tread,
wherein, at least on one side axially with respect to the median plane, the sub-layer has:
  a base layer disposed radially on the crown reinforcement and axially between the median plane and a shoulder, said first base layer being made up of a rubber compound of given stiffness A, a covering layer disposed radially on the base layer and radially on the inside of the tread and axially at least in portions situated between the median plane and the shoulder end, said covering layer being made up of a rubber compound of given stiffness B, the stiffness A being less than the stiffness B, and the stiffness B being greater than the stiffness M, the dynamic shear modulus G* of the material of the base layer, measured at 23° C. and under an alternating shear stress at a frequency of 10 Hz and at 10% deformation, being less than 0.6 MPa.

In the present document, and in accordance with practice, a sub-layer is a tire constituent inserted between the crown reinforcement and the material of the tread, that is to say disposed radially above the cords or equivalent elements and radially on the inside of the wearing layer of a tire, commonly called the "tread"; such a constituent is therefore disposed radially on the inside of the radially outermost area of the wear indicators when the tire is provided therewith. In the present invention, this constituent comprises several materials of different composition. In an advantageous embodiment, the covering layer is axially continuous from one shoulder of the tire to the other shoulder. In a preferred embodiment, the covering layer is formed by several portions that are separated axially, said covering layer being interrupted under the furrows, and, axially at some points, the covering layer is extended radially outwards by at least one reinforcing element extending radially towards the outside of the tread.

BRIEF DESCRIPTION OF THE DRAWINGS

The invention will now be described with the aid of the appended drawing, in which.

DETAILED DESCRIPTION OF THE DRAWINGS

Figure 1:
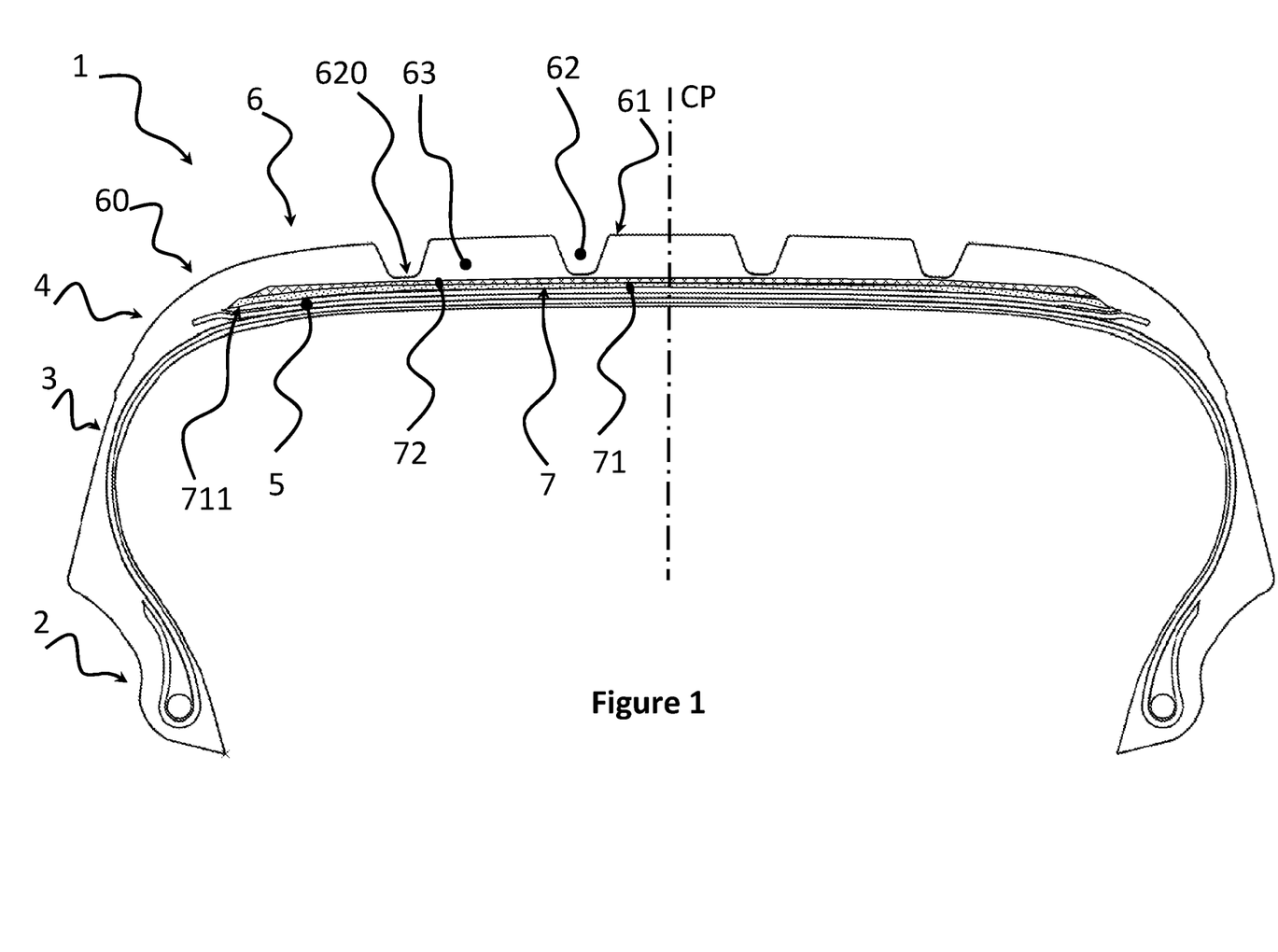
FIG. 1 schematically shows a meridian section through a tire according to a first embodiment of the invention.

FIG. 1 shows a tire 1, an equatorial plane CP, two beads 2 and two sidewalls 3 each connected to a bead 2. The tire has a crown 4, which has a crown reinforcement 5 and a tread 6. The tread extends axially from one shoulder 60 to the other shoulder. The tread comprises a contact face 61 intended to come into contact with the roadway when the tire is being driven on. The tread 6 has tread blocks 63 that are separated by furrows 62 that are oriented substantially circumferentially. Each furrow 62 is delimited radially towards the inside by a furrow bottom 620.

The crown also has a sub-layer 7 disposed radially on the outside of the crown reinforcement 5 and radially on the inside of the tread 6. This sub-layer is formed by two parts: a base layer 71 and a covering layer 72.

The base layer 71 is disposed radially directly on the crown reinforcement 5. As is known per se, the crown reinforcement has layers of cords or of monofilament reinforcers that are generally coated with a thin layer of rubber.

In the context of the present invention, the indication that the base layer 71 is disposed radially directly on the crown reinforcement 5 means that it is in contact with the cords or reinforcers, not taking the rubber coating thereof into account.

A covering layer 72 disposed radially on the base layer and axially at least in portions situated between the median plane CP and the shoulder end 60 can also be seen. Note that, in this embodiment, the material of the tread 6 is visible in the groove bottom 620; the material of the covering layer 72 is thus coated (radially upwardly) by a very thin film of tread material 6.

Figure 2:
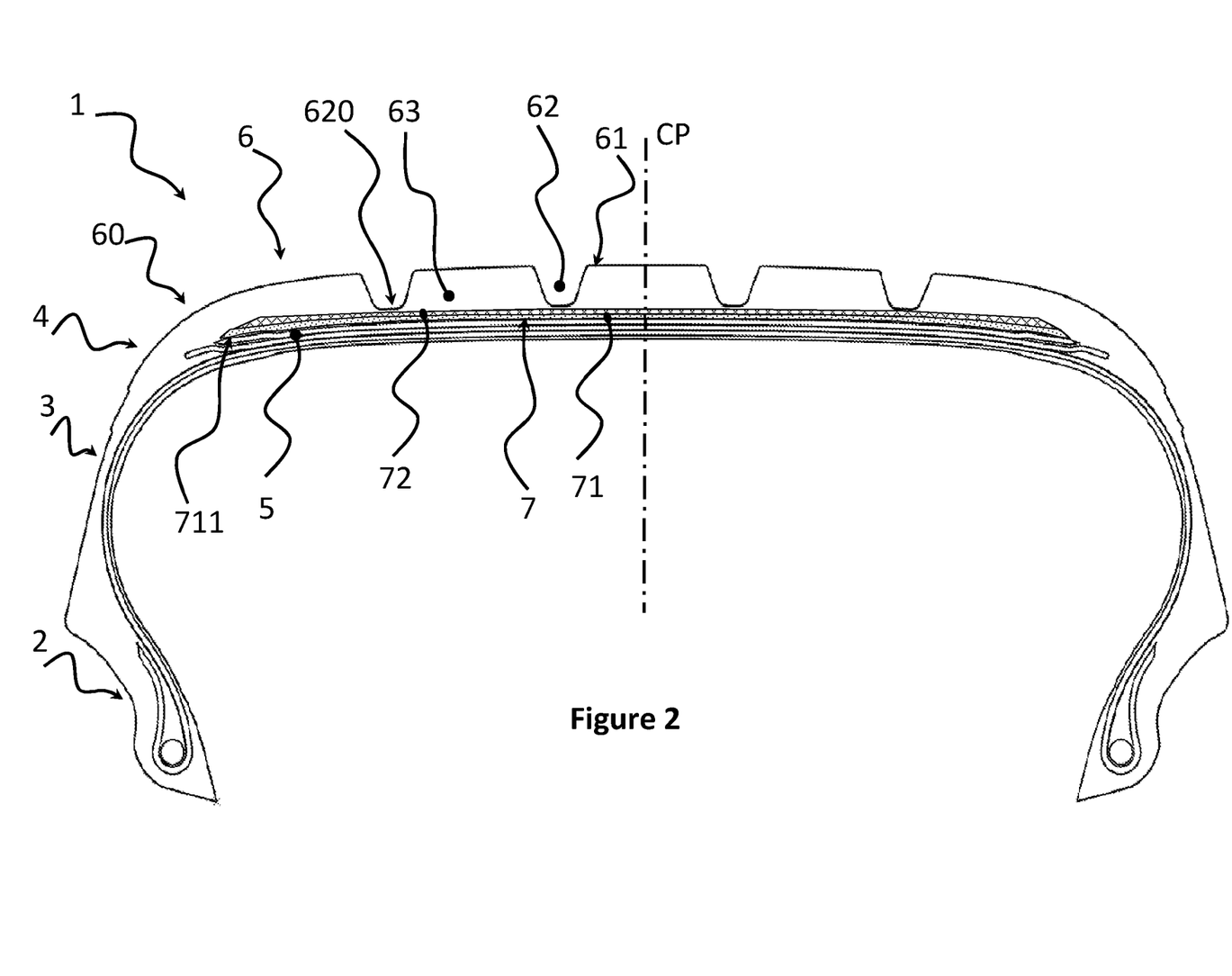
FIG. 2 schematically shows a meridian section through a tire according to a second embodiment of the invention.

FIG. 2 shows a second embodiment of the invention, very similar to the one illustrated in FIG. 1: in this second embodiment, the material of the covering layer 72 is visible in the groove bottom 620.

The materials used for the sub-layer 7 will now be discussed. In order to characterize them, the dynamic shear modulus G* measured at 23° C. and under an alternating shear stress at a frequency of 10 Hz and at 10% deformation is used.

Preferably, the material of the base layer 71 is characterized by a dynamic shear modulus G* measured at 23° C. and under an alternating shear stress at a frequency of 10 Hz and at 10% deformation of less than 1.5 MPa and preferably less than 0.5 MPa; very advantageously, the dynamic shear modulus G* of this material, measured at 23° C. and under an alternating shear stress at a frequency of 10 Hz and at 10% deformation, has a value of 0.3 MPa. These are conventional values for sub-layers of the usual configuration, that is to say ones that are made of a single material and extend axially from one shoulder of the tire to the other. Advantageously, the tg δ value measured at 23° C. at 10 Hz and under an alternating shear deformation of 10% of the material of the base layer 71 is less than 0.3 and very advantageously, the tg δ value is around 0.05.

As for the covering layer 72, the material thereof is preferably characterized by a dynamic shear modulus G* measured at 23° C. and under an alternating shear stress at a frequency of 10 Hz and at 10% deformation of greater than 7 MPa and preferably greater than 12 MPa; very advantageously, the dynamic shear modulus G* of this material, measured at 23° C. and under an alternating shear stress at a frequency of 10 Hz and at 10% deformation, has a value greater than 20 MPa. In this way, good cornering stiffness is achieved and an excellent performance compromise is obtained, reconciling a drift thrust that is able to give the tire a good dynamic response and excellent rolling resistance. Advantageously, the tg δ value measured at 23° C. at 10 Hz and under an alternating shear deformation of 10% of the material covering layer 72 is less than 0.3.

An example of an appropriate formulation for the material of the base layer 71, with a dynamic shear modulus G* measured at 23° C. and under an alternating shear stress at a frequency of 10 Hz and at 10% deformation of 0.2 MPa, is as follows:

TABLE 1

| Component | phr |
|---|---|
| NR | 100 |
| Carbon black | 4 |
| 6PPD | 2.2 |
| DPG | 2.1 |

TABLE 1-continued

| Component | phr |
|---|---|
| Stearic acid | 3 |
| ZnO | 1.5 |
| Resin | 29.3 |
| HTO | 38 |

The formulations are given by weight (phr meaning percentage of the weight of elastomer).

An example of an appropriate formulation for the material of the covering layer 72, with a dynamic shear modulus G* measured at 23° C. and under an alternating shear stress at a frequency of 10 Hz and at 10% deformation of 25 MPa, is as follows:

TABLE 2

| Component | phr |
|---|---|
| NR | 100 |
| Carbon black | 70 |
| Phenol-formaldehyde resin | 12 |
| ZnO | 3 |
| Stearic acid | 2 |
| 6PPD | 2.5 |
| HMT | 4 |
| Sulfur | 3 |
| CBS | 2 |

The formulations are given by weight (phr meaning percentage of the weight of elastomer).

As for the material of the tread, according to the invention, the stiffness M thereof is less than the stiffness B of the covering layer. Advantageously, the rubber compound has a dynamic shear modulus G* measured at 23° C. and under an alternating shear stress at a frequency of 10 Hz and at 10% deformation of less than 4.0 MPa and preferably less than 2.5 MPa.

The following Table 3 gives an example of a tread formulation:

TABLE 3

| Component | phr |
|---|---|
| SBR (a) | 100 |
| Silica (b) | 110 |
| Coupling agent (c) | 9 |
| Liquid plasticizer (d) | 20 |
| Resin plasticizer (e) | 50 |
| Black | 5 |
| Zinc oxide | 3 |
| Stearic acid | 2 |
| Antioxidant (f) | 2 |
| Accelerator (g) | 2 |
| DPG | 2 |
| Sulfur | 1 |

The formulations are given by weight (phr meaning percentage of the weight of elastomer), with:
(a) SBR with 27% stirene, 1,2-butadiene: 5%, cis-1,4-butadiene: 15%, trans-1,4-butadiene: 80% Tg −48° C.
(b) "Zeosil1165MP" silica from Solvay with BET surface area of 160 m²/g
(c) "SI69" TESPT silane from Evonik
(d) "Flexon 630" TDAE oil from Shell
(e) "Escorez 2173" resin from Exxon
(f) "Santoflex 6PPD" antioxidant from Solutia
(g) "Santocure CBS" accelerator from Solutia A person skilled in the art, who is a tire designer, could adopt embodiment variants in which the tread itself comprises several different materials that are superposed radially and/or juxtaposed axially.

Figure 3:
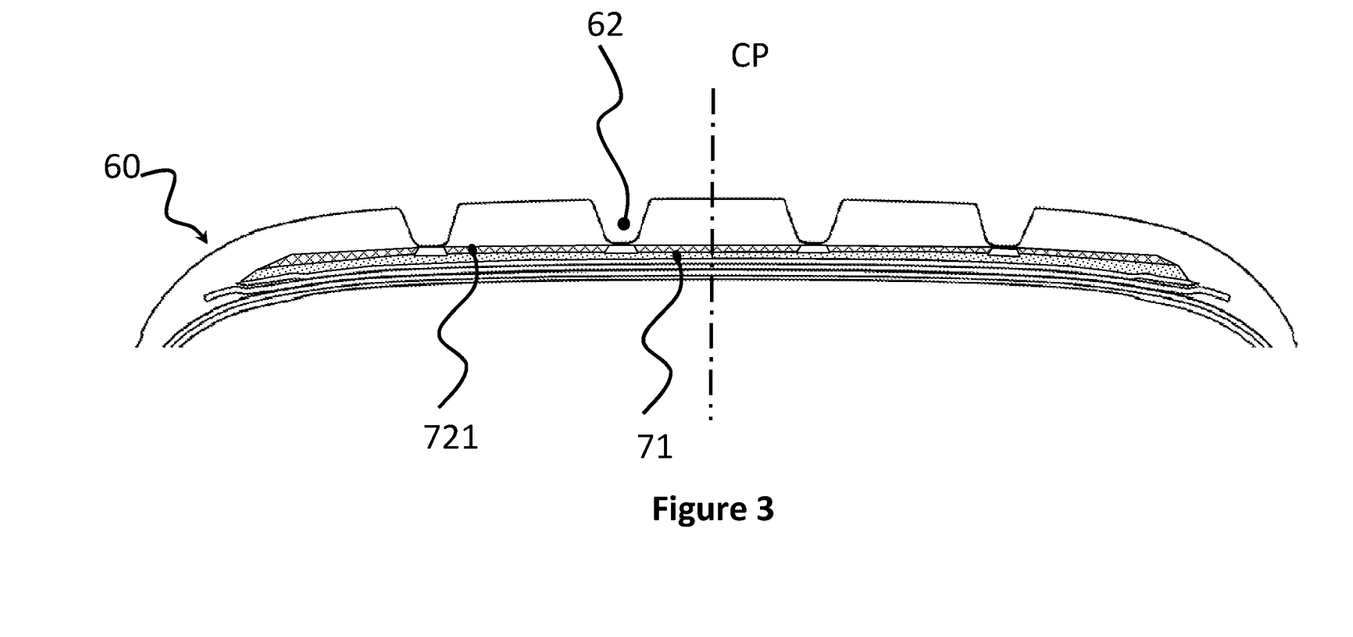
FIG. 3 is a simplified depiction of a third embodiment of the invention.

In the embodiment of the invention illustrated in FIGS. 1 and 2, the covering layer 72 is axially continuous between the two shoulders 60. FIG. 3 shows a third embodiment, in which a covering layer 721 is formed by several portions that are separated axially, said covering layer being interrupted under the furrows 62. At the interruption, the material that is visible at the furrow bottom 620 is the same as the material of the tread 6. Overall, this embodiment makes it possible to significantly improve the rolling resistance at the cost of a very modest worsening in the cornering stiffness. Advantageously, the material visible at the bottom of the furrow 620 is the same material as the material of which the tread 6 is made (that is to say the predominant material in the tread).

Figure 4:
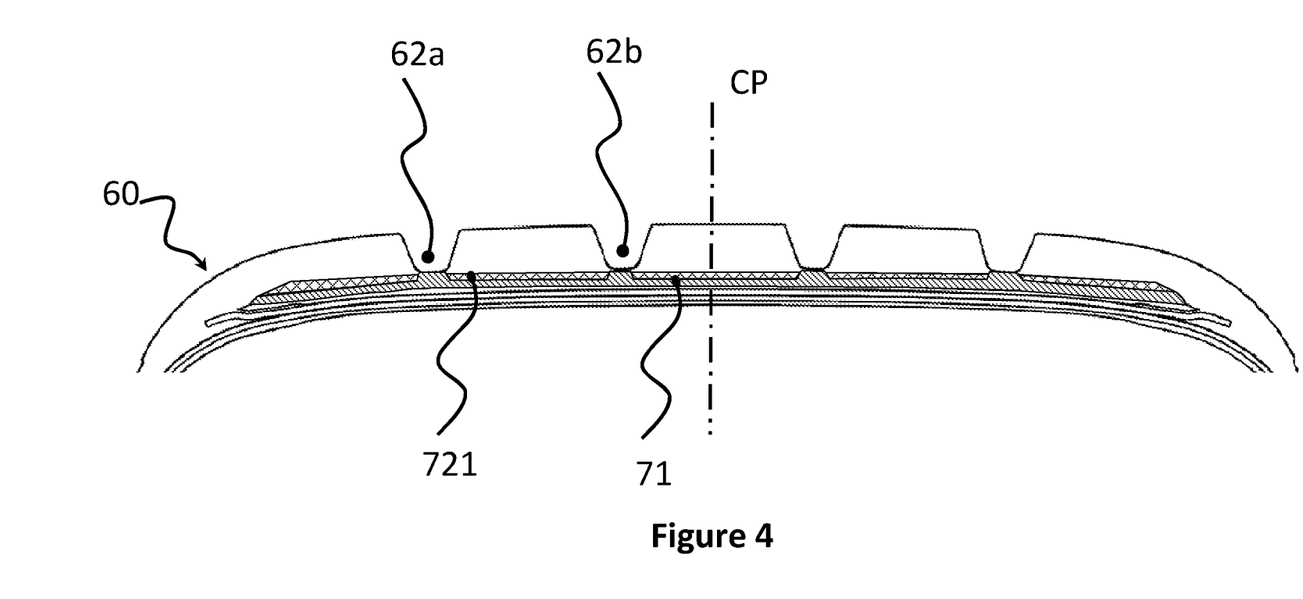
FIG. 4 shows a simplified depiction of a fourth embodiment of the invention.

FIG. 4 illustrates a fourth embodiment of the invention, very similar to the one illustrated in FIG. 3: in this fourth embodiment, at the interruption, the material visible at the furrow bottom 620 is the same as the material of the base layer (71) situated radially beneath the furrow in question; thus, it can be seen that the material of the base layer 71 is visible at the bottom of the furrow 62*a* and of the furrow 62*b*.

Figure 5:
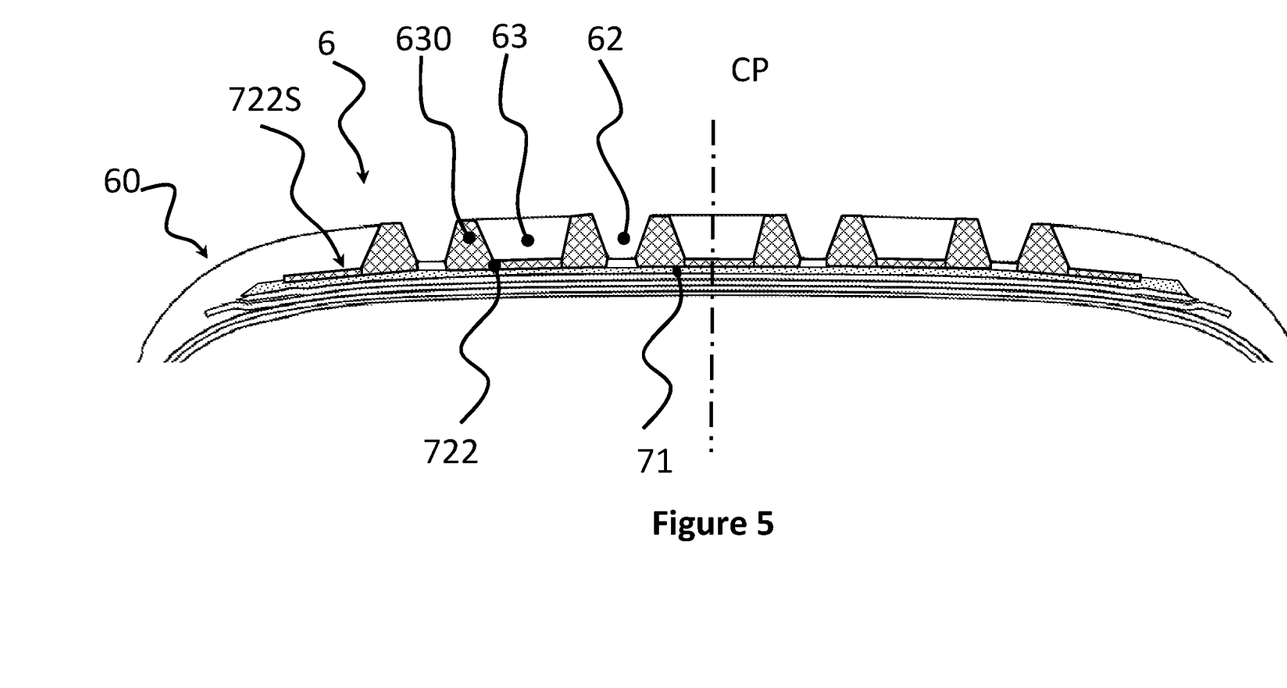
FIG. 5 is a simplified depiction of a fifth embodiment of the invention.

In order to improve the rolling resistance and at the same time to improve the cornering stiffness, it is possible to use wedge-shaped elements 630 in the wearing part of the tread. FIG. 5 illustrates a fifth embodiment, in which a covering layer 722, axially at some tread blocks 63, is extended radially outwards by a wedge-shaped reinforcing element 630 (seen in meridian section). This reinforcing element 630 extends radially from the radially outer surface 722S of the covering layer 722 towards the outside of the tread 6 to a radial height greater than 75% of the radial thickness of the tread. Said reinforcing element 630 is of variable axial width, from a maximum value less than 50% of the axial width of said tread block, said axial width decreasing radially upwardly. The angle formed in radial section by the two lateral walls of said reinforcing element 630 is preferably between 10° and 50°, specifically for example 40°, as illustrated in FIG. 3. The tread has such a reinforcing element 630 on either side of each furrow 62. Each reinforcing element is advantageously made up of the same rubber compound as the covering layer 722, thereby making it possible to extrude them in one and the same operation with the covering layer 722.

Tests

As control, use is made of a tire R having a tread made of a compound with a dynamic shear modulus G* measured at 23° C. and under an alternating shear stress at a frequency of 10 Hz and at 10% deformation of 3.0 MPa, and a single-material sub-layer extending axially from one shoulder of the tire to the other and having a thickness that is radially substantially constant; as seen in radial section, the profile of this sub-layer is the same as the profile of the assembly of the base layer 71; this sub-layer is formed by a compound having a dynamic shear modulus G* measured at 23° C. and under an alternating shear stress at a frequency of 10 Hz and at 10% deformation of 0.2 MPa. A first test tire T1 is in accordance with the example of the invention that is illustrated in FIG. 1, using the materials illustrated in Tables 1 to 3. A second test tire T2 is in accordance with the example of the invention that is illustrated in FIG. 3 (covering layer 721 interrupted), using the materials illustrated in Tables 1 to 3. A third test tire T3 is in accordance with the example of the invention that is illustrated in FIG. 5 (this example combines an interrupted covering layer with reinforcing elements 630 on either side of each furrow 62, these two embodiment aspects being able to be used independently of one another), using the materials illustrated in Tables 1 to 3. The rolling resistance value (kg/T) and cornering stiffness value Dz (N/°) are with respect to the base 100 for the control R and expressed as relative values with respect to the base 100 for the tires according to the invention. The measurement of the cornering stiffness of a tire makes it possible to evaluate the road holding of a vehicle through the capacity thereof to react during an action on the steering wheel or to follow the trajectory of a bend. This cornering stiffness is measured on an apparatus and consists in causing a tire mounted on a rim and inflated to a nominal pressure to roll on a bonded metal strip, by means of a machine of the "Flat Track" type. The measurement is taken when the tire is rolling at 80 km/h with a chain of stresses varying the load, cornering and camber conditions. The rolling resistance can be measured in accordance with the standard ISO28580.

TABLE 4

|  | Cornering stiffness (with respect to a base 100) | Rolling resistance (with respect to a base 100) |
| --- | --- | --- |
| Tire R | 100% | 100% |
| Tire T1 (FIG. 1) | 89% | 110% |
| Tire T2 (FIG. 3) | 84% | 110% |
| Tire T3 (FIG. 5) | 118% | 113% |

It will be noted that the invention allows the performance compromise between rolling resistance and cornering stiffness to be moved; it allows a very significant improvement in the rolling resistance at the cost of a reduction in the cornering stiffness that is quite acceptable for applications to passenger vehicles in which the desired performance is especially rolling comfort. It will also be noted that, by adopting the fifth embodiment, a very large increase both in rolling resistance and in cornering stiffness is achieved.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire having an axis of rotation and a median plane (CP) perpendicular to the axis of rotation, comprising:
   a crown reinforcement,
   a tread radially on the outside of the crown reinforcement, the tread comprising material extending axially between two shoulders, the tread comprising a contact face intended to come into contact with a roadway when the tire is being driven on, the tread being made up of at least one rubber compound of given stiffness M, wherein the tread has furrows, oriented substantially circumferentially, each furrow having a respective bottom furrow width, and
   a sub-layer disposed radially on the outside of the crown reinforcement and radially on the inside of the tread, wherein at least on one side axially with respect to the median plane (CP), the sub-layer is formed by:
   a base layer disposed radially directly on the crown reinforcement and axially between the median plane (CP) and a shoulder, said base layer being made up of a rubber compound of given stiffness A,
   a covering layer disposed radially directly on the base layer and radially on the inside of the tread and axially separated in portions situated between the median plane (CP) and the shoulder, said covering layer being made up of a rubber compound of given stiffness B, wherein the portions are radially beneath the contact face of the tread and separations in the covering layer, each have a respective axial separation width, are arranged radially beneath the furrows, wherein for each respective separation that is radially in line with a respective furrow, each respective axial separation width is equal to the respective bottom furrow width, wherein a radially outer face of the covering layer is planar,
   the stiffness A being less than the stiffness B, and the stiffness B being greater than the stiffness M, and the dynamic shear modulus G* of material of the base layer, measured at 23° C. and under an alternating shear stress at a frequency of 10 Hz and at 10% deformation, being less than 0.6 MPa.

2. The tire according to claim 1, wherein the dynamic shear modulus G* of the material of the base layer, measured at 23° C. and under an alternating shear stress at a frequency of 10 Hz and at 10% deformation, is less than 0.5 MPa.

3. The tire according to claim 1, wherein the tg δ value measured at 23° C. at 10 Hz and under an alternating shear deformation of 10% of the material of the base layer is less than 0.3.

4. The tire according to claim 1, wherein the dynamic shear modulus G* of material of the covering layer, measured at 23° C. and under an alternating shear stress at a frequency of 10 Hz and at 10% deformation, is strictly greater than 7 MPa.

5. The tire according to claim 4, wherein the dynamic shear modulus G* of the material of the covering layer, measured at 23° C. and under an alternating shear stress at a frequency of 10 Hz and at 10% deformation, is strictly greater than 12 MPa.

6. The tire according to claim 4, wherein the tg δ value measured at 23° C. at 10 Hz and under an alternating shear deformation of 10% of the material of the covering layer is less than 0.3.

7. The tire according to claim 1, wherein the covering layer is formed by at least three portions that are separated axially.

8. The tire according to claim 1, wherein material visible at the bottom of each furrow is the same material as the material of which the tread is made.

* * * * *